United States Patent [19]

Settlemyer

[11] Patent Number: 4,898,599
[45] Date of Patent: Feb. 6, 1990

[54] DESICCANT GAS DRYING SYSTEM
[75] Inventor: Bernard W. Settlemyer, Ocala, Fla.
[73] Assignee: Pneumatic Products Corporation, Ocala, Fla.
[21] Appl. No.: 352,373
[22] Filed: May 12, 1989
[51] Int. Cl.⁴ .............................................. B01D 53/04
[52] U.S. Cl. .......................................... 55/28; 55/33; 55/179; 55/208; 55/387
[58] Field of Search ............... 55/23, 28, 31, 33, 35, 55/62, 179, 208, 387, 389

[56] References Cited

U.S. PATENT DOCUMENTS

| | | | |
|---|---|---|---|
| 2,071,868 | 2/1937 | Von Lüde | 55/33 |
| 3,568,406 | 3/1971 | Dynes | 55/33 |
| 3,766,660 | 10/1973 | Settlemyer | 34/9 |
| 3,785,755 | 1/1974 | Novak et al. | 418/85 |
| 4,338,101 | 7/1982 | Tuttle | 55/208 X |
| 4,343,629 | 8/1982 | Dinsmore et al. | 55/28 |
| 4,405,343 | 9/1983 | Othmer | 55/28 |
| 4,696,681 | 9/1987 | Lloyd-Williams | 55/28 |
| 4,700,550 | 10/1987 | Rhodes | 55/208 X |
| 4,783,432 | 11/1988 | Settlemyer | 502/34 |

FOREIGN PATENT DOCUMENTS 54-114859 9/1979 Japan ..................... 55/179

Primary Examiner—Robert Spitzer
Attorney, Agent, or Firm—Foley & Lardner

[57] ABSTRACT

An apparatus for continuously drying gas delivered from a compressor for compressing moisture laden gas in which oil is heated and discharged and separated from the gas includes a dryer having a moisture adsorbing condition and a regenerating condition and valves for selectively utilizing the heated oil from the compressor to control the moisture adsorbing and regenerating conditions of the dryer, and selectively admitting the separated gas delivered from the compressor to the dryer.

9 Claims, 3 Drawing Sheets

DESICCANT GAS DRYING SYSTEM

TECHNICAL FIELD

The present invention relates generally to an apparatus and method for supplying dry, purified gas from a compressor system and, more particularly, relates to an apparatus and method for supplying dry, purified gas from an oil, flooded screw compressor system utilizing a desiccant dryer wherein the heated oil from the screw compressor is utilized as the regeneration energy for adsorption-type drying.

BACKGROUND OF THE INVENTION

It is well known that, in providing compressed gas for industrial processes and other applications, it is usually necessary to eliminate moisture from the compressed gas system in order to prevent corrosion and contamination, which eventually impair the proper functioning of components within the system. In the past, various arrangements have been, employed which utilized cooling devices, desiccants and other instruments for dehydrating and purifying moisture laden compressed gas. As a general rule, it is desirable to use drying equipment capable of producing consistently low dewpoints regardless of ambient temperature or seasonal fluctuations.

The general manufacturing industry today is a predominant user of refrigeration gas drying equipment for removing water from compressed gas. In such apparatus, the moist gas to be dried is flowed through a heat exchange chamber which cools the point where moisture condenses and is drained from the gas. Refrigeration-type dryers have remained popular because of their economical cost, easy maintenance, simple installation requirements and low energy consumption. However, experience has demonstrated that refrigeration dryers are somewhat restrictive in certain applications because they generally produce dewpoints in the range of 35° F.-50° F. and also exhibit some freezing problems in low ambient temperatures.

Another type of prior art gas drying system which has proved highly satisfactory for use in industrial processes is the desiccant or adsorption dryer which dries gas by adsorbing water molecules onto the surface of an adsorbent drying agent or desiccant such as alumina or silica gel. In systems of this type, the gas to be treated is transmitted through a desiccant bed until it becomes substantially saturated with moisture or other impurities. At this point, removal of moisture by the desiccant bed is terminated, and the bed is reactivated or regenerated by heating the bed such that the absorbed moisture and impurities are evaporated and transferred away. In continuous production of dry gas, a pair of adsorbent beds is employed so that one of the beds is drying gas while the other is being regenerated. One such system is disclosed in U.S. Pat. No. 3,766,660 issued Oct. 23, 1973, to the inventor of the current invention; see also U.S. Pat. No. 4,783,432.

Desiccant dryers are particularly desirable in some applications because they are capable of producing $-40°$ F. dewpoints. However, their performance is dependent upon desiccant regeneration, and the temperature and humidity of the gas used in the regeneration greatly affects dewpoint production. Although most compressors produce sufficient heat of 300° F.-50° F. for regeneration, it has been found that, in some types of desiccant dryers of the heated regenerated type, extraneous energy sources, such as booster heaters, are necessary to increase regeneration quality. Unfortunately, such additional requirements increase the cost in equipment and energy expended, and generally create further maintenance problems. The art has previously attempted to address these problems by providing adsorption dryers which utilize the heat of compression as regeneration energy for the adsorbent beds. In other words, there have been arrangements designed which extract the heat energy from the compressed gas for application in reactivating the saturated adsorbent bed.

One such interesting design is shown in U.S. Pat. No. 3,568,406 issued Mar. 9, 1971 to Dynes. In this desiccant dryer, most of the gas to be dehydrated is fed through a cooler and a first adsorbing desiccant, while a portion of the very gas to be dehydrated is employed to reactivate a second saturated desiccant which is used for extracting the aqueous constituents from the system. Although such arrangements have been an advance in the right direction, the energy efficient results have not been universally applicable to all compressors. Especially problematical are oil flooded screw compressors which do not have discharge temperatures high enough for regeneration and are saturated with cooling media vapor. Utilization of the Dynes '406 patent with an oil flooded screw compressor would allow hot, wet oily gas to bypass the cooler and be introduced to the adsorbent beds, fouling or clogging the desiccant and thereby shortening its life and the efficiency of the entire system.

For many of the same reasons explaining the popularity of refrigeration dryers, oil flooded screw compressors are in prevalent use in manufacturing environments throughout the world. However, to date the art has not responded adequately to the needs of the manufacturing industry for a dryer producing clean, dry gas at a dewpoint of $-40°$ F. which can be used efficiently in conjunction with an oil flooded screw compressor. It is particularly desirable that such a drying scheme address the feasibility of utilizing the relatively low 170° F.-220° F. discharge temperature of the heated oil from the screw compressor, which heretofore has been wasted, to effect regeneration of the dryer.

At best, the prior art has contemplated the utilization of heated oil to simply heat compressed air. Such teaching is found in U.S. Pat. No. 3,785,755 issued Jan. 15, 1974 to Novak et al. While this system does reheat and lower the relative humidity of the air, it does not reduce the dewpoint lower than that leaving the moisture separator of the system and, notably, fails to include any dryer. This system continually reheats the compressed air with heated oil and is dependent upon this continual heat for function.

From the foregoing, it can be seen that various attempts have been made by the prior art to treat compressed air. However, there remains a need in this well-developed art for a compressed gas system which furnishes a low dewpoint gas product by applying the compressor oil heat as regeneration energy to desorb moisture from, the, adsorbent bed and which effectively marries a desiccant dryer with an oil flooded screw compressor.

SUMMARY OF THE INVENTION

The present invention advantageously provides an improved adsorptive dryer for a compressed gas system which will efficiently remove moisture from compressed gas. The dryer f the present invention is noteworthy of its cost competitiveness and superior reliability due to the simplicity of design as well as its energy efficiency by utilization of heat previously wasted.

These and other advantages are realized in one aspect of the present invention by an apparatus for continuously drying gas comprising an oil-type compressor for compressing moisture laden gas whereby oil is heated and separated from the gas, a dryer connected to the compressor for removing moisture from the gas and having a moisture adsorbing and regenerating condition and a device connected to the compressor and the dryer for utilizing the heated oil from the compressor to selectively control the moisture adsorbing and regenerating conditions of the dryer.

The present invention also relates to a method for continuously drying gas delivered from an oil discharging compressor comprising the steps of compressing moisture laden gas in the compressor whereby gas and oil are heated, separating the heated oil from the heated gas, removing the moisture from the gas by means of a dryer having a moisture adsorbing condition and a regenerating condition and selectively applying the heated oil to the dryer for controlling the moisture adsorbing and regenerating conditions of the dryer.

In a highly preferred embodiment, an oil flooded screw compressor provides a compressed, heated gas-oil mixture fed into a gas-oil separator which separates the heated oil from the heated compressed moist gas. The heated compressed gas is then cooled in an aftercooler and has moisture removed and drained away in a moisture separator. At this point, all of the compressed cooled gas enters an adsorbent bed where it is dried and purified and discharged for use. While the compressed gas is being treated, the heated oil from the compressor is advantageously directed through a heat exchanger tube in a companion adsorbent bed, which in saturated condition causes moisture and contaminants entrained therein to be evaporated through a vent to atmosphere. As a result, the companion adsorbent bed is reactivated by the heated oil which is subsequently cooled in an oil cooler and returned to the compressor. Accordingly, application of the energy from the heated oil of the compressor which is generally wasted is positively used to improve the drying behavior of the system. By controlling suitable valves at the inlets and outlets of the adsorbent beds, compressed moist air is selectively fed through one of the beds capable of drying the compressed gas while the heated oil is selectively placed in heat exchanging relationship with the other bed to regenerate its drying agent. This cycle is continuously repeated to achieve a resultant dry gas product equivalent to or exceeding that of prior art dryers.

Thus, the present invention advantageously and distinctively provides a gas dryer for an oil discharging compressor wherein the oil is not only reclaimed for use in the compressor, but, notwithstanding its relatively low temperature, is utilized via heat transfer to efficiently reactivate the dryer without the use of any of the gas to be treated.

The various features of novelty which characterize this invention are pointed out with particularity in the claims annexed to and forming part of this specification. For a better understanding of the invention and its operating advantages, reference should be had to the accompanying drawings and descriptive matter in which there is illustrated and described a preferred embodiment of the invention.

BRIEF DESCRIPTION OF THE DRAWINGS

The invention will become better understood by reference to the following drawings wherein like numerals denote like elements, and.

DETAILED DESCRIPTION OF THE PREFERRED EMBODIMENT

The present invention relates generally to a gas dryer of the adsorption-type which uses heat of compression for regeneration energy in removing moisture from a compressed gas and, more specifically, to a gas dryer of this sort wherein a desiccant dryer is made compatible with an oil type screw compressor to produce purified, dehydrated gas for industrial applications. Accordingly, the invention will now be described with reference to a certain preferred embodiment in the foregoing contexts; those skilled in the art will appreciate that such a description is meant to be exemplary and should not be deemed limitative. For example, the principles of the present invention are equally adaptable to other oil discharging compressors, such as oil flooded vanes and liquid ring compressors, and various adsorbent dryer schemes beyond heat of compression dryers including, but not limited to, split stream dryers with and without cooling, captive loop dryers, atmospheric blower dryers and the like.

Figure 1:
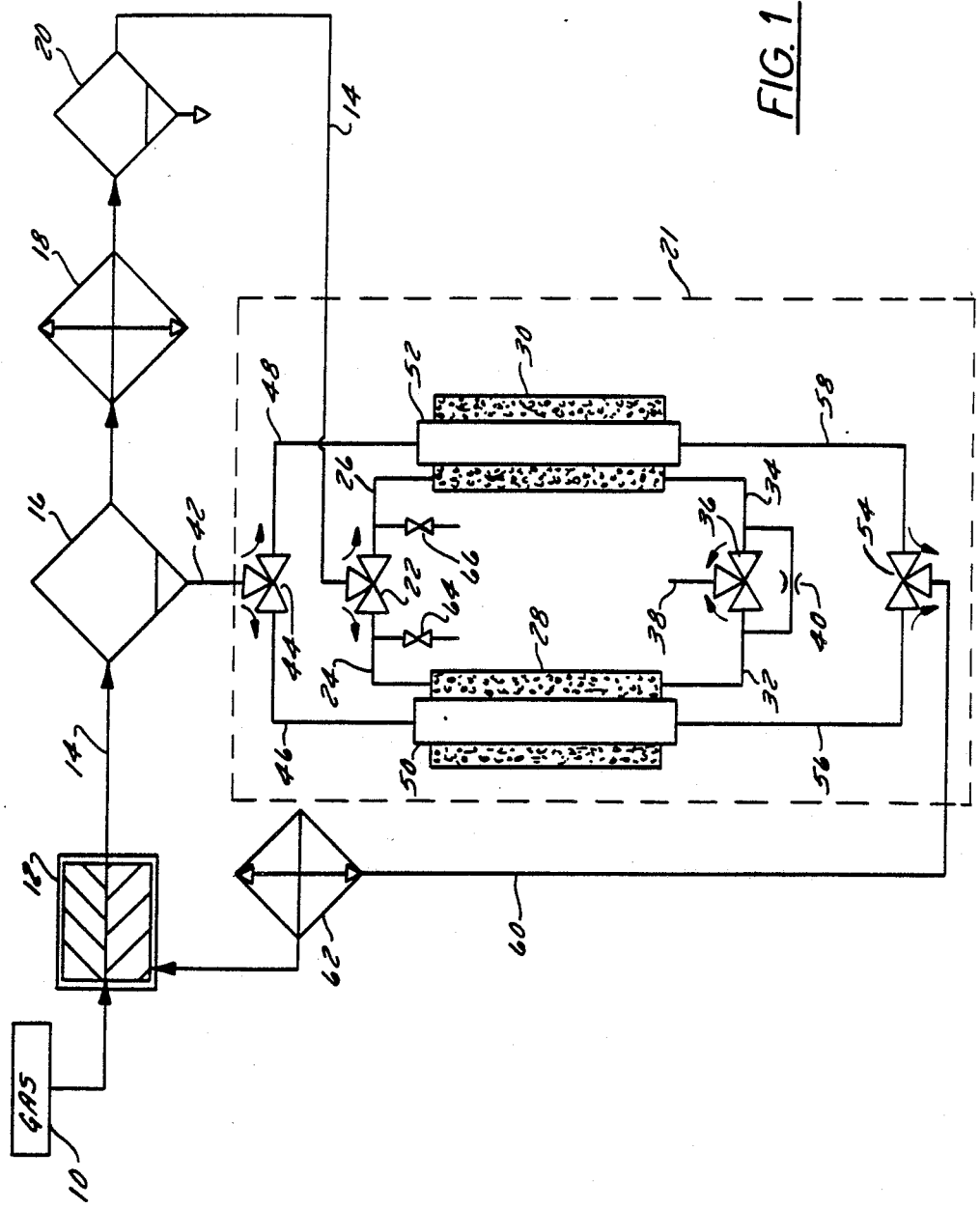
FIG. 1 is schematic diagram illustrating a gas drying system according to the present invention.

Referring now to FIG. 1, a source of gas 10, such as ambient air, is placed in communication with an oil flooded screw compressor 12 for compressing gas which is connected serially by conduit 14 with an gasoil separator 16, an aftercooler 18 and a moisture separator 20. Separator 20 is joined by conduit 14 to a gas intake valve 22 which is coupled by primary intake conduits 24, 26 for selectively feeding compressed gas to a pair of adsorbent beds 28, 30, respectively. Beds 28, 30 each contain a moisture adsorbing material or desiccant such as alumina or silica gel, or natural or synthetic zeolites. Primary outlet lines 32, 34 are connected to beds 28, 30 respectively and are joined to a gas discharge valve 36 from which dried gas exhausts through a conduit 38. A purge valve 40 is connected in shunting relationship to gas discharge valve 36.

Gas-oil separator 16 is joined by a conduit 42 for supplying oil to an oil intake valve 44 which is coupled by secondary inlet lines 46, 48 to selectively route heated oil to one of heat exchanger tubes 50, 52 extending through the interior of beds 28, 30 respectively. An oil discharge valve 54 is connected via secondary outlet lines 56, 58 to tubes 50, 52. Oil discharge valve 54 is further joined via conduit 60 to an oil cooler 62 in communication with compressor 12.

Each of the valves 22, 36, 44 and 54 are conventionally known three-way valves operated by control means such as a clock timer, electronics, or a microprocessor (not shown) so that when either of the beds 28, 30 is in a drying or moisture adsorbing condition, the other of the beds 28, 30 is in a saturation (or regeneration) condition. Also, it is noted that each of the beds 28, 30 has venting inlets 64, 66 respectively, for removing moisture from the beds 28, 30 during regeneration.

In operation, gas, typically ambient air, is fed into oil flooded screw compressor 12 which compresses the gas and pumps the compressed gas and oil at 100 psig, 170° F. and 170° F. dewpoint via conduit 14 into gasoil separator 16. As is well known in this type of compressor, the oil seals, lubricates and cools screw compressor 12 and adsorbs the majority of the heat resulting from the compression of the gas. The gas exits from gas-oil separator 16 and flows into aftercooler 18 where the temperature of the gas is decreased. Then, the gas enters moisture separator 20 where water condensate is separated and drained. The moisture laden gas, now at 100 psig and 100° F., is now directed towards the dryer 21 for further treatment. With bed 28 in an adsorbing condition, gas delivered through conduit 14 is channeled to valve 22 which is opened to allow the moist gas to flow via conduit 24 through the desiccant in bed 28, and be conducted out in a dehydrated state via conduit 32 to valve 36 which is opened to the outlet conduit 38. The dried gas flowing from conduit 38 is applied as desired, such as through a hose for a paint spraying application or the like.

Meanwhile, heated oil from compressor 12 flows through conduit 42 to valve 44 which is opened to permit the 170° F. oil to be conducted via conduit 48 through heat exchanger tube 52 in bed 30 where it heats the saturated desiccant. In this manner the moisture in the saturated bed 30 is evaporated and carried from the desiccant for exhaust to the atmosphere through vent 66. Purge valve 40 which may be controlled by a fixed orifice or a throttle valve assists this evacuation and will open to divert a predetermined amount of dry discharge gas delivered via conduit 32 to conduit 34 in order to help sweep the moisture through the vent 66. Oil exits from tube 52 via conduit 58 and is fed into opened valve 54. Then, the oil is transmitted through conduit 60 to oil cooler 62 and returned to compressor 14 to complete reclamation of the oil.

When bed 28 becomes saturated, the system will function to operate valves 22, 36, 44, 54 in an alternate fashion so that moist compressed gas is dried by the moisture adsorbing desiccant in bed 30 and oil is directed through heat exchanger tube 50 in bed 28 for reactivating the saturated desiccant therein.

While the preferred embodiment contemplates the use of purge valve 40 for allowing dry discharge gas sweep to assist regeneration of a bed 30, it should be understood that moisture of evaporation could be vented to atmosphere without such arrangement; alternatively, the evaporated moisture could be blown away by a fan, extracted by a suction pump or otherwise evacuated through vent 66.

Thus, the present invention greatly enhances the energy efficiency of an oil type compressor drying system by utilizing the previously wasted heated oil of the compressor to regenerate the dryer. Such efficiency is attained with an attendant dewpoint of the resultant dried gas comparable to dryness values obtained in prior art heat of compression dryers which regenerate typically at 325° F.

Figure 2:
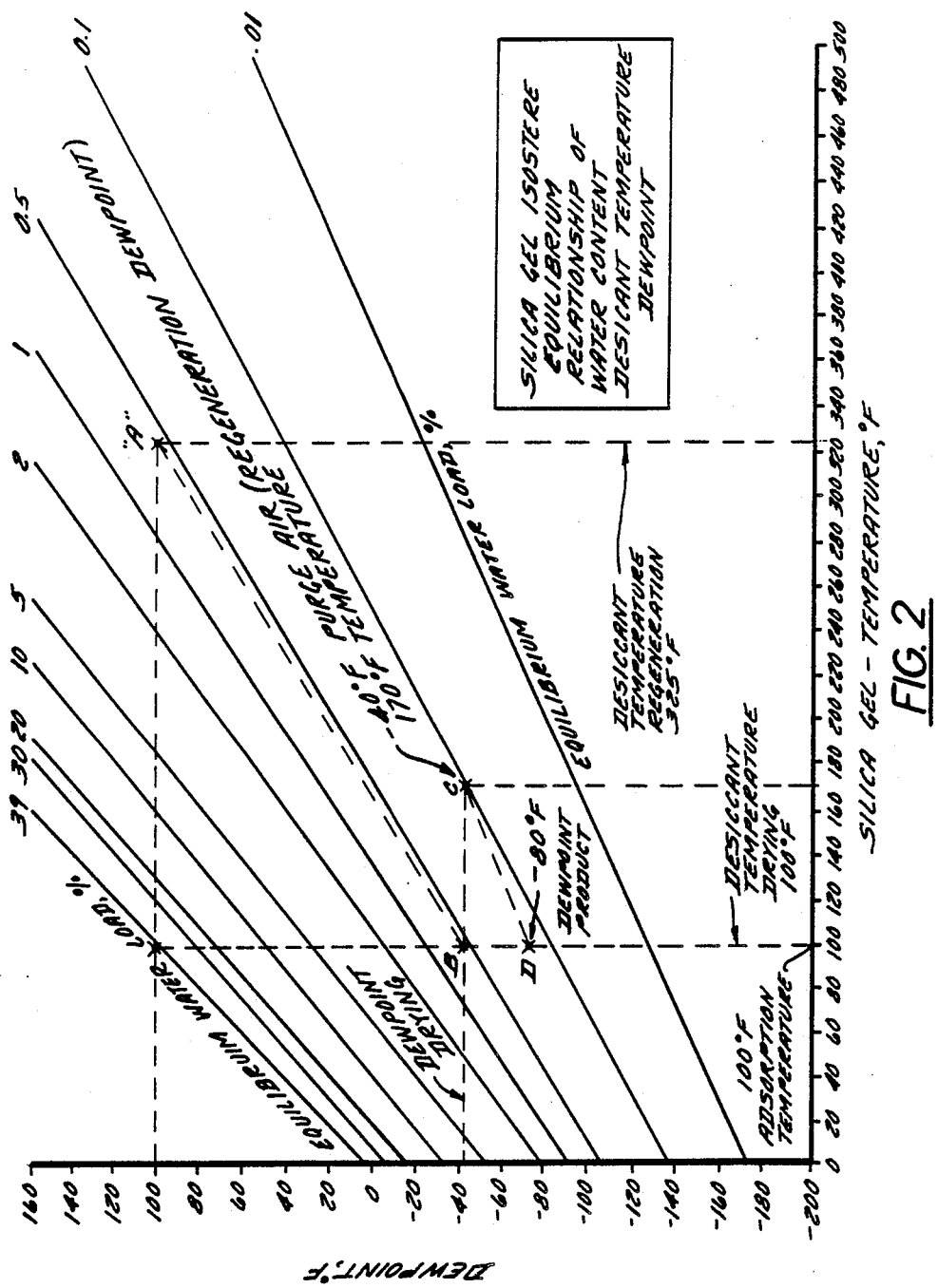
FIG. 2 is an isostere graph for the desiccant, silica gel, as preferably used in the present invention.

Such comparison can be better understood by examining the isostere graph of FIG. 2 which shows the equilibrium relationship of desiccant water content. temperature and dewpoint for a typical desiccant, silica gel. Assuming that a prior art heat of compression dryer has a desiccant bed temperature of 325° F. during regeneration, a regeneration air dewpoint of 100° F. and a desiccant bed temperature of 100° F. during drying, the dewpoint during drying can be determined by finding the intercept of the 325° F. bed temperature with the 100° F. dewpoint at point A and following the constant water load line (isostere) to the intercept with the 100° F. bed temperature at point B which predicts an ideal dewpoint of −40° F.

When comparing this with the system of the present invention, it is noted that the desiccant bed temperature is 170° F., the, regeneration air dewpoint is −40° F. and the desiccant bed temperature during drying is 100° F. Using the isostere, finding the intercept at point C and following the isotere to point D predicts an ideal dewpoint of about −80° F. Even noting that dynamic conditions will not allow this dewpoint production, dewpoints produced will still be comparable to 40° F. dewpoints associated with other adsorption type dryers.

Figure 3:
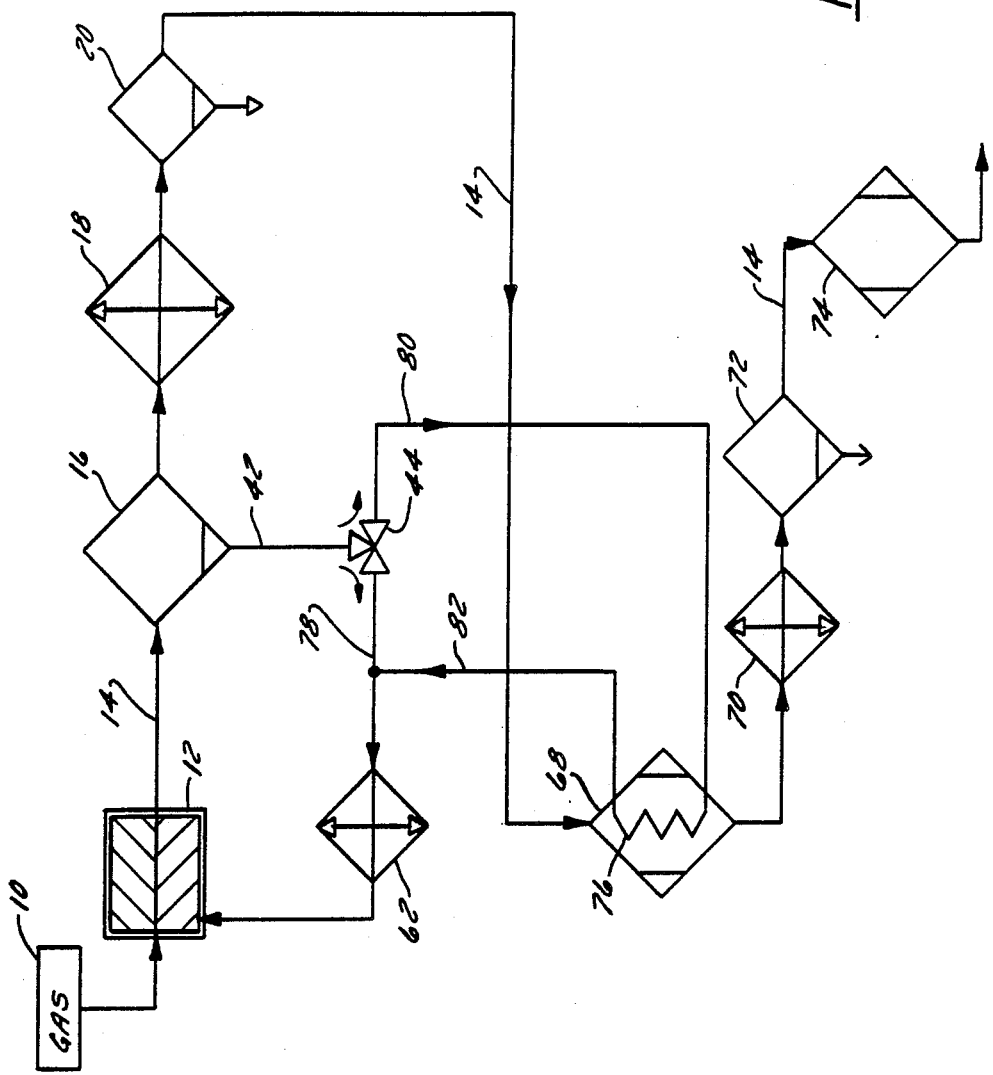
FIG. 3 is a schematic diagram of an alternative embodiment of the present invention.

In the alternative embodiment shown in FIG. 3, elements identical to those shown in FIG. 1 are identified by the same numerals. The embodiment of FIG. 3 also contains a dryer similar to above-mentioned U.S. Pat. No. 3,766,660. A primary adsorbent bed 68, a cooler 70, a moisture separator 72, and a secondary adsorbent bed 74 are serially connected via conduit 14 so that compressed moist gas entering the primary bed 68 will exit as dry gas via the secondary bed 74. A heat exchanger 76 such as of the serpentine tube or tube and fin type is provided in primary bed 68 to operate along with cooler 70 and moisture separator 72 during the reactivating condition of the bed 68. A conduit 78 connects valve 44 with oil cooler 62 while heat exchanger 76 has inlet and outlet conduits 80 and 82 joined to valve 44 and conduit 78, respectively.

When primary bed 68 is in moisture adsorbing condition, heat exchanger 76, cooler 70 and moisture separator 72 are inoperative. The compressed moist gas flowing via conduit 14 into primary bed 68 is dried and has a sufficiently low dewpoint that it will remove moisture from the saturated secondary bed 74 and still satisfy the dryness requirement of the gas being discharged. Accordingly, the secondary bed 74 is regenerated while the gas is being dried by the primary bed 68. Meanwhile, valve 44 is opened to allow heated oil to flow via conduit 78 to oil cooler 62 for return to compressor 12.

When the primary bed 68 becomes saturated, heat exchanger 76, cooler 70 and moisture separator 72 are inoperative. Valve 44 opens to permit oil to flow via inlet conduit 80 through heat exchanger 76 and outlet conduit 82 to conduit 78 for return to cooler 62 and compressor 12. A suitable check valve (not shown) may be included in conduit 82 to prevent oil from conduit 78 flowing into conduit 82. Thus, the heated oil heats the incoming compressed moist gas so that the heated gas causes evaporation of moisture from primary bed 68 and carries the evaporated moisture from the bed 68. The heated gas now saturated is cooled in cooler 70 and the resulting condensation of moisture is removed by separator 72. The cooled gas next flows through secondary bed 74 where sufficient moisture is adsorbed so that discharge gas is dried at the specified requirement of the system.

Unlike prior gas dryers, the present invention does not require any extraneous energy sources, such as booster heaters, to attain proper regeneration. In addition, the present dryer is more energy efficient in being able to treat all the compressed gas at once rather than using a portion of the compressed gas to reactivate the dryer. By focusing upon the utilization of heat normally wasted, the oil flooded screw compressor discharge, which is too cool, too wet and too oily for prior art drying systems, can be efficiently dehydrated and purified over a wide variety of temperatures and humidities.

While the invention has now been described with reference to a preferred embodiment, those skilled in the art will appreciate that certain substitutions, alterations and omissions may be made without departing from the spirit thereof. Accordingly, the foregoing description is meant to be exemplary only and should not be deemed limitative on the scope of the invention set forth in the following claims.

I claim:

1. A method for producing a dried, compressed gas, which comprises:

compressing a moist gas in the presence of an oil to produce a hot, compressed, moisture-laden, oily gas;

separating hot oil from said compressed gas; and alternately contacting said gas with an adsorbent which adsorbs moisture from said gas and transferring heat from said hot oil to said absorbent to intermittently desorb moisture from said adsorbent.

2. An apparatus for compressing and drying a gas, comprising:

a gas compressor having means for producing a hot, compressed, moisture-laden, oily gas and means for separating hot oil from said compressed gas;

a dryer connected to said compressor for receiving said compressed gas from said compressor, said dryer having an adsorbent capable of alternately assuming a moisture adsorbing condition and a regenerating, moisture desorbing condition, and conduit means for circulating said compressed gas through said adsorbent to dry said compressed gas; and means connected to said compressor and said dryer for intermittently transferring heat from said hot oil to said adsorbent to cause said adsorbent to assume said regenerating condition.

3. Apparatus according to claim 2, further comprising means for regulating flow of said compressed gas so that said gas flows through said adsorbent when said adsorbent is in said adsorbing condition and ceases flowing through said adsorbent when said adsorbent is in said regenerating condition.

4. Apparatus according to claim 2, further comprising conduit means for passing compressed gas from said compressor to said dryer.

5. Apparatus according to claim 4, wherein said adsorbent comprises a pair of adsorbent beds, and said heat transferring means comprises a pair of heat exchange tubes proximate each of said beds.

6. Apparatus according to claim 5, wherein said means for passing compressed air to said dryer further comprises first valve means for alternately passing said compressed gas through each of said beds, said heat transferring means further comprises second valve means for alternately conducting said hot oil through each of said heat exchanger tubes, and said first and second valve means are operable to cause one of said beds to assume a moisture adsorbing condition while the other of said beds assumes a regenerating condition by passing said gas through said beds in a moisture adsorbing condition while conducting said oil through said heat exchanger tube of the other of said beds.

7. Apparatus according to claim 6, further comprising an oil cooler and means for conducting said oil from each of said heat exchanger tubes to said cooler.

8. Apparatus according to claim 2, wherein said adsorbent comprises a pair of adsorbent beds, said heat transferring means comprises a heat exchanger proximate one of said beds, and said conduit means connects said beds in series for conducting said gas first through one of said beds and then through the other.

9. An apparatus for compressing and drying a gas, comprising:

a gas compressor having means for producing a hot, compressed, moisture-laden, oily gas and means for separating hot oil from said compressed gas;

a dryer connected to said compressor for receiving said compressed gas from said compressor and drying said gas; and means for transferring heat from said hot oil to said dryer to purge accumulated moisture from said dryer.

* * * * *